(No Model.)
T. E. MILLER.
COMBINATION IMPLEMENT FOR SEALING PACKAGES AND RAILROAD CARS.
No. 270,092. Patented Jan. 2, 1883.
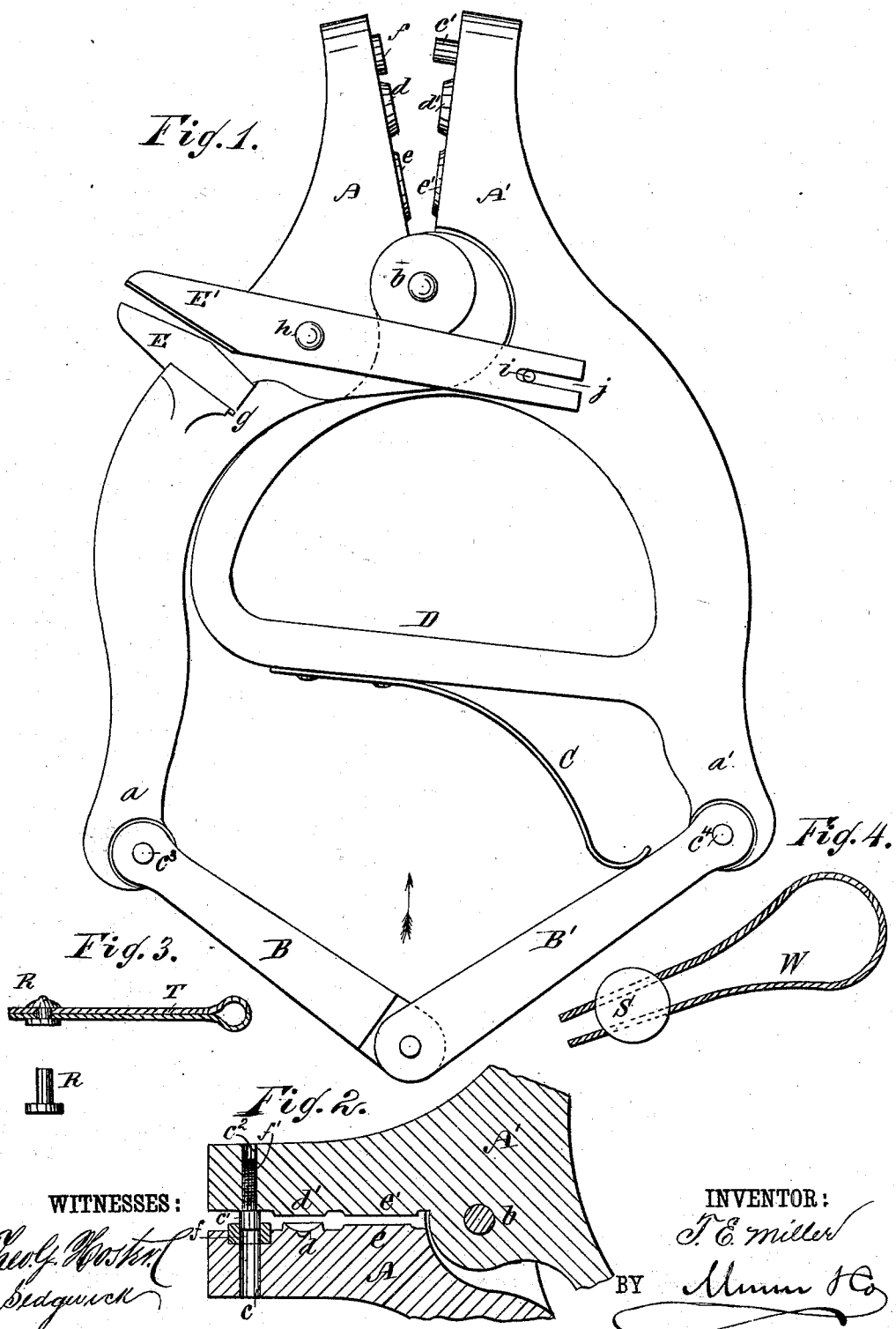
WITNESSES:
Theo. G. Hoster
C. Sedgwick
INVENTOR:
T. E. Miller
BY Munn & Co.
ATTORNEYS.
N. PETERS. Photo-Lithographer, Washington, D. C.

UNITED STATES PATENT OFFICE.

THEODORE E. MILLER, OF HOUSTON, TEXAS.

COMBINATION IMPLEMENT FOR SEALING PACKAGES AND RAILROAD-CARS.

SPECIFICATION forming part of Letters Patent No. 270,092, dated January 2, 1883.

Application filed February 13, 1882. (No model.)

*To all whom it may concern:*

Be it known that I, THEODORE E. MILLER, of Houston, in the county of Harris and State of Texas, have invented a new and useful Improvement in Combination Implements for Sealing Packages and Railway-Cars, of which the following is a full, clear, and exact description.

My invention consists of an implement combining all the tools necessary for rapidly and easily sealing railroad-cars and packages with the ordinary wire or tin seals, and of the particular construction of the implement.

Reference is to be had to the accompanying drawings, forming a part of this specification, in which similar letters of reference indicate corresponding parts in all the figures.

Figure 1 is a front elevation of my new sealing implement. Fig. 2 is a partial sectional elevation of the jaws of the same. Fig. 3 is a perspective view of an ordinary tin seal with lead rivet, and Fig. 4 is a plan view of the ordinary wire seal and the lead lock.

In applying the tin seals the strip of tin T is first cut the proper length and then punched, and the lead rivet R passed through the holes thus made in the tin, and the rivet is then headed, as shown in Fig. 3, for securing the ends of the strip. In applying the wire seal W the wire is first cut the proper length, the ends of the wire are then passed through the perforations of the lead lock or seal S, and the seal is then compressed upon the ends of the wires for securing the ends of the wires in the seal. The implement which I have invented for accomplishing all of these operations is formed of the jaws A A', which are pivoted together by the pivot $b$, and the toggle-levers B B', placed between the ends $a\,a'$ of the levers A A', and pivoted thereto by the pivots $c^3 c^4$, as shown in Fig. 1. The jaw A' is cast with the grasp D, which stands between the jaws, as shown in Fig. 1. Upon the back of the grasp is riveted the spring C, the outer end of which impinges against the lever B' of the toggle and serves to hold the toggle-levers forced outward and the main jaws open, except when power is applied to the toggle-levers for closing the main jaws. The face of the jaw A is formed with the passage $c$, recess $d$, and plain raised surface or head $e$. The jaw A' is provided with the punch $c'$ and formed with the plain anvil-surface $d'$, which closes against the recess $d$, and with the plain raised surface or head $e'$, which closes against the corresponding surface, $e$, of the jaw A. The passage $c$ of the jaw A is faced with the steel collar $f$, and the punch is formed with the screw-shank $f'$, which screws into the threaded opening $c^2$ through the jaw A'. By this means, when these parts become too much worn for effective use, they may be removed from the jaws and new ones easily put in their place.

E E' represent the jaws of the shears used for cutting the strip of tin or pieces of wire of the seals. The jaw E is a short jaw and is held in the recess $g$, formed in the side of the jaw A, while the jaw E' is of considerable length and is pivoted to the jaw A upon the pivot $h$. The outer end of the jaw E' of the shears is formed with the slot $j$, which fits over the pin $i$, fixed in the jaw A' of the implement, as shown in Fig. 1. By this arrangement of the jaws of the shears upon the main jaws of the implement it will be seen that by operating the main jaws by pressure upon the toggle-levers B B' the cutting-edges of the jaws E E' will be brought forcibly together for cutting any object that may have been placed between them.

In use the implement is to be grasped with the hand of the user passing around the grasp D and the toggle-levers B B' at the central joint. The grasp D furnishes a fixed abutment for the hand, so that the power can be applied to the best advantage to the toggles, which, together with the long arms $a\,a'$ of the main jaws, furnish a long leverage, causing the faces of the main jaws and the cutting-edges of the shears to approach each other with great force, thus making the implement effective and easy of operation.

In case the tin seal T is to be used, the strip of tin will, as above stated, first be cut the proper length by the shears of the implement, and then placed between the faces of the main jaws and punched with two holes—one near each end of the strip of tin. The ends of the strip will then be passed through suitable loops, staples, or similar attachments of the package, car-door, or other thing to be sealed, and brought together, and the rivet R passed through the holes punched in the strip. The implement will then be applied to the rivet in such manner that the end of the rivet will rest in the recess $d$ and the head thereof upon the anvil-face $d'$. Power now being applied to the toggles will bring the faces of the main jaws together and head the rivet, as shown in Fig. 3, and thus complete the sealing.

In case the wire seal W is used, the wire will first be cut the proper length by the shears and passed through the loops, staples, or similar attachments of the package, car-door, or other thing to be sealed, and then passed through the perforations of the lead seal S. The implement is then to be applied to the seal in such manner that the seal S will come between the plain raised surfaces or heads $e\ e'$. Power being now applied to the toggles will bring the face of the main jaws together upon the lead seal and compress it upon the ends of the wire, and hold the wire in the seal and complete the sealing.

The wires and strips of tin may be cut before the sealing operation by any ordinary cutting means; or they may be cut off after the heading of the rivet or compressing of the seal. In the former case the shears on the implement will not be needed, and hence in some instances they may be omitted from the implement.

Having thus described my invention, I claim as new and desire to secure by Letters Patent—

1. In a sealing-press, the combination, with the jaw A, provided with the passage $c$, the recess $d$, and raised compressing-surface $e$, of the jaw A', provided with the punch $c'$, the anvil-face $d'$, and raised compressing-surface $e'$, and means, substantially as herein shown and described, for operating said jaws, as set forth.

2. The jaw A', formed with the grasp D, in combination with the jaw A and the toggle-levers B B', substantially as described.

3. In a sealing-press, the combination, with the pivoted jaws A A', of the stationary cutting-jaw E, secured to the jaw A, and the movable cutting-jaw E', pivoted to the said jaw A, and having its outer end slotted and fitting over a pin on the jaw A', substantially as and for the purpose set forth.

4. The implement herein shown and described, consisting of the main pivoted jaws A A', toggle-levers B B', and the cutting-blades E E', the jaw A' being formed with the grasp D, raised face $e'$, anvil-face $d'$, and carrying punch $c'$, the jaw A being formed with the passage $c$, recess $d$, and raised face $e$, the blade E' being pivoted to the jaw A and operated by the pin $i$, fixed in the jaw A', substantially as described.

THEODORE E. MILLER.

Witnesses:
W. W. STILES,
ALEX. PASTORIZA.